(12) United States Patent
Soldano et al.

(10) Patent No.: US 7,215,560 B2
(45) Date of Patent: May 8, 2007

(54) EMI NOISE REDUCTION CIRCUIT AND METHOD FOR BRIDGELESS PFC CIRCUIT

(75) Inventors: Marco Soldano, El Segundo, CA (US); Bin Lu, Blacksburg, VA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/301,464

(22) Filed: Dec. 13, 2005

(65) Prior Publication Data

US 2006/0208711 A1  Sep. 21, 2006

Related U.S. Application Data

(60) Provisional application No. 60/635,793, filed on Dec. 14, 2004.

(51) Int. Cl.
*H02M 1/12* (2006.01)
*H02M 7/12* (2006.01)

(52) U.S. Cl. .......................................... 363/44; 363/89
(58) Field of Classification Search ................ 363/39, 363/44, 47, 48, 89, 127
See application file for complete search history.

(56) References Cited

U.S. PATENT DOCUMENTS

| | | | | |
|---|---|---|---|---|
| 4,412,277 | A | 10/1983 | Mitchell | ............... 363/81 |
| 5,793,624 | A * | 8/1998 | Couture et al. | ............... 363/89 |
| 6,122,182 | A * | 9/2000 | Moisin | ............... 363/39 |
| 6,411,535 | B1 * | 6/2002 | Roux | ............... 363/124 |
| 6,570,366 | B1 * | 5/2003 | Lin et al. | ............... 323/207 |
| 6,671,192 | B2 * | 12/2003 | Maeda et al. | ............... 363/44 |

OTHER PUBLICATIONS

J.C. Zolper, "Wide Bandgap Semiconductor Microwave technologies From Promise to Practice", Dec. 1999, IEEE International Electron Devices Meeting, p. 16.1.1-16.1.4.*

Shoyama M., Tsumura T., and Ninomiya T.,"Mechanism of Common-Mode Noise Reduction in Balanced Boost Switching Converter," PESC'04, pp. 1115-1120.

A. deSouza and I. Barbi, "New Zero Voltage Switching Pulse Width Modulated Unity Power Factor Rectifier with Reduced Conduction Losses," IEEE Transactions on Power Electronics, Nov. 1995, pp. 746-752.

* cited by examiner

*Primary Examiner*—Gary L Laxton
(74) *Attorney, Agent, or Firm*—Ostrolenk, Faber, Gerb & Soffen, LLP (57) ABSTRACT

A circuit and method for improving EMI noise performance in a bridgeless PFC boost converter. Such a converter comprises a boost inductor having a first end connected to a first AC input terminal and a second end connected to a first junction defined between the anode of a first diode and a first terminal of a first switch; a second terminal of the first switch connected to a common line; a parallel circuit of a capacitance and a load connected between the cathode of the first diode and the common line; a series circuit of a second diode and a second switch connected between the cathode of the first diode and the common line; and a second AC input terminal connected to a second junction defined between the anode of the second diode and the second switch. High-frequency EMI noise is bypassed by placing a first filter capacitor between the first AC terminal and the common line. A second boost inductor may be connected between the second AC input terminal and the second junction, and a second filter capacitor may be connected between the second AC terminal and the common line. The first and/or second filter capacitor has a lower impedance in a high frequency range than the corresponding first or second boost inductor. Preferably the first and second capacitors have substantially the same capacitance.

16 Claims, 9 Drawing Sheets

EMI NOISE REDUCTION CIRCUIT AND METHOD FOR BRIDGELESS PFC CIRCUIT

CROSS REFERENCE TO RELATED APPLICATIONS

The present application is based upon and claims priority of provisional application Ser. No. 60/635,793, filed Dec. 14, 2004, incorporated by reference.

BACKGROUND OF THE INVENTION

1. Field of the Invention

The present invention relates to a circuit and method for improving EMI noise performance in a bridgeless PFC boost converter, and more particularly to an improvement including a bypass filter capacitor connected to an AC source terminal.

2. Related Art

Figure 1:
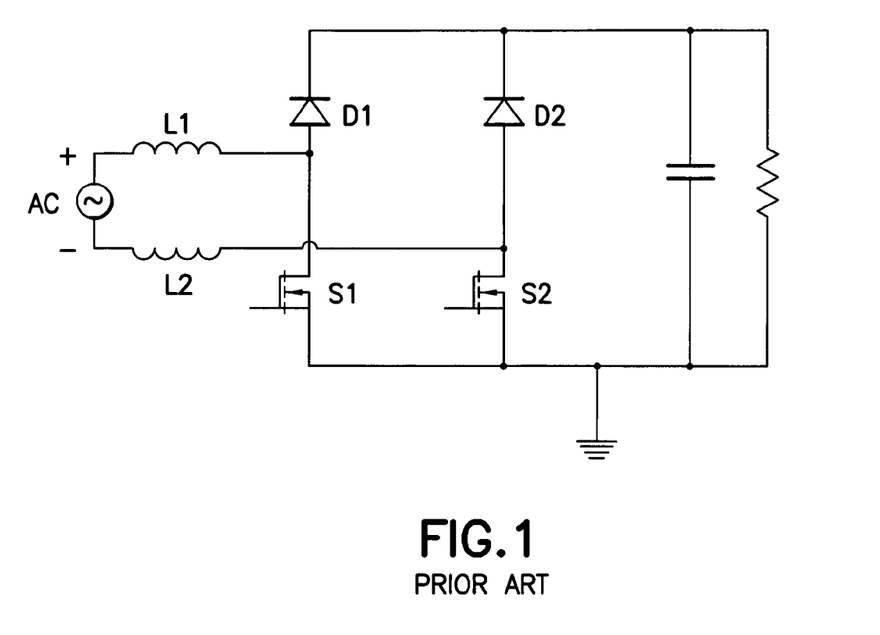
FIG. 1 shows a conventional bridgeless PFC (power factor correction) circuit.

A conventional bridgeless PFC circuit for power factor correction is shown in FIG. 1. As compared with the conventional PFC circuit including a bridge, shown in FIG. 2, the bridgeless PFC circuit reduces the number of semiconductor devices in the conduction path. In the conventional PFC circuit, there are three semiconductors in the current conduction path. As for the bridgeless PFC circuit, only two semiconductor devices are in any given conduction path. Both circuits work as a boost DC/DC converter, and the switching loss is substantially the same. However, the bridgeless PFC can reduce the circuit conduction loss and improve the circuit efficiency. Further, since the bridgeless circuit only uses two MOSFETs and two diodes, as compared with the conventional PFC, which has one MOSFET and five diodes, the circuit is much simplified.

Although the bridgeless PFC circuit provides simplified circuit structure and improved efficiency, the circuit has severe EMI noise.

Figure 2:
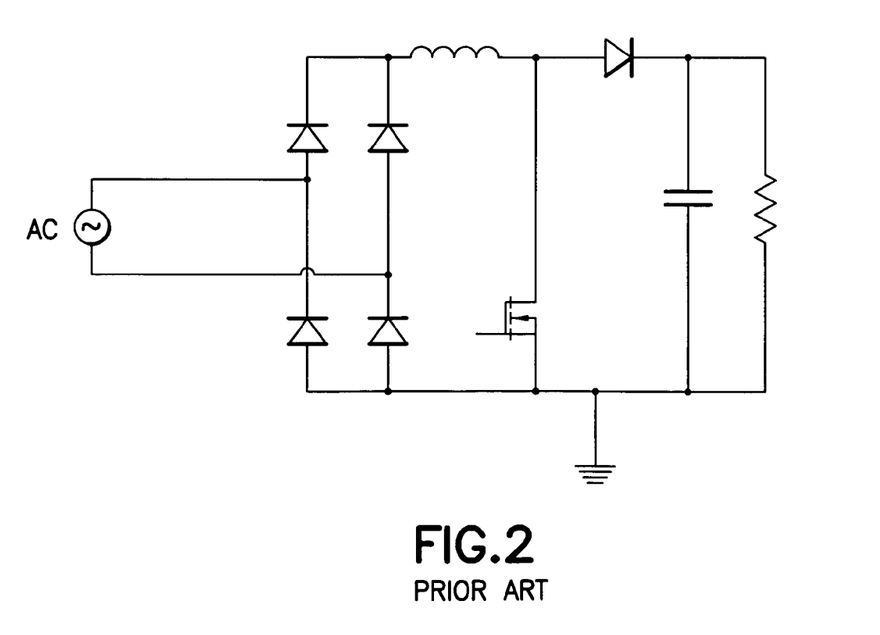
FIG. 2 shows a conventional PFC circuit including a bridge.
Figure 3A:
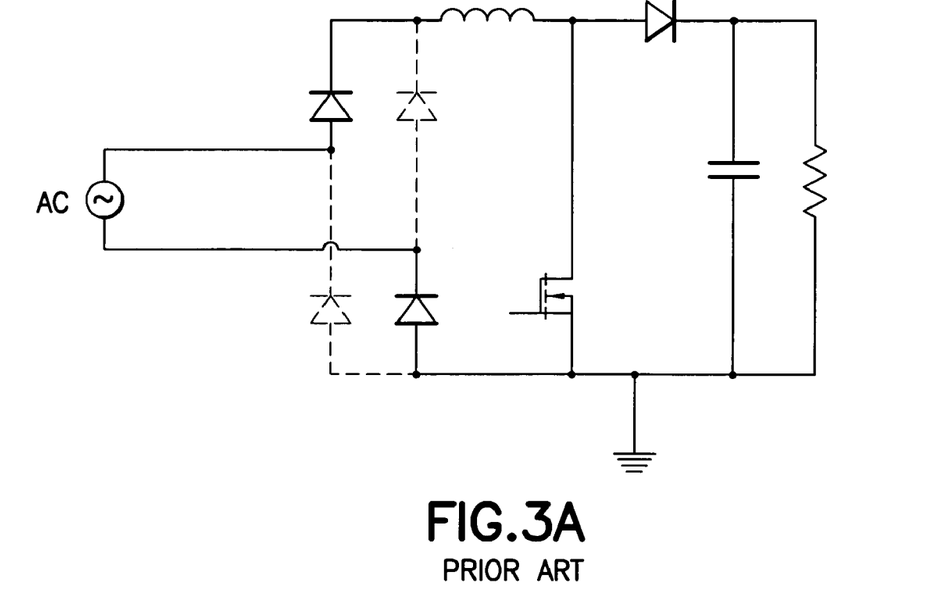
FIGS. 3a and 3b show equivalent circuits of the conventional PFC circuit of FIG. 2 in the positive and negative half line cycles, respectively.
Figure 3B:
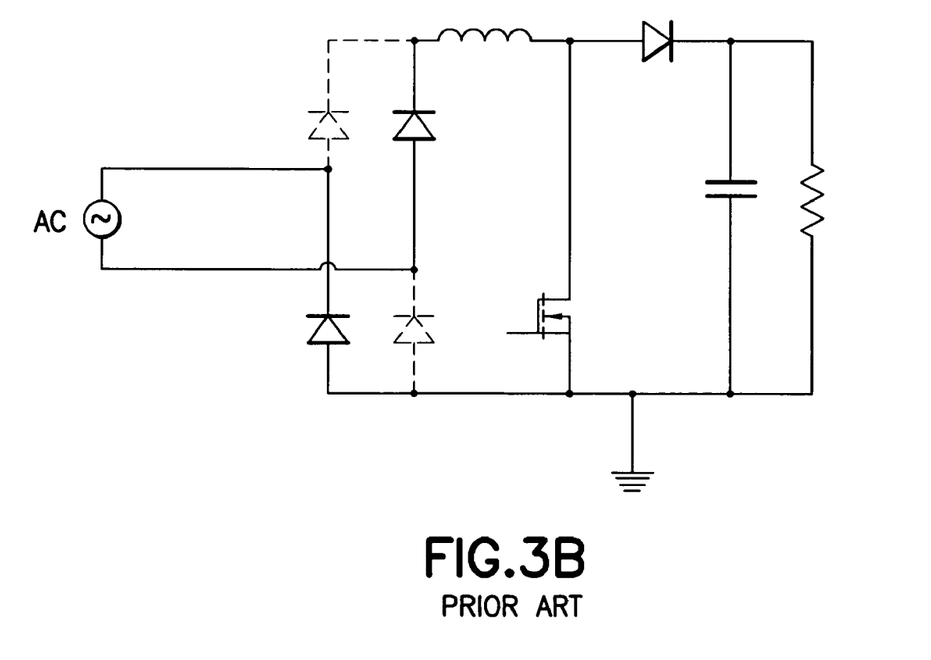
Figure 4:
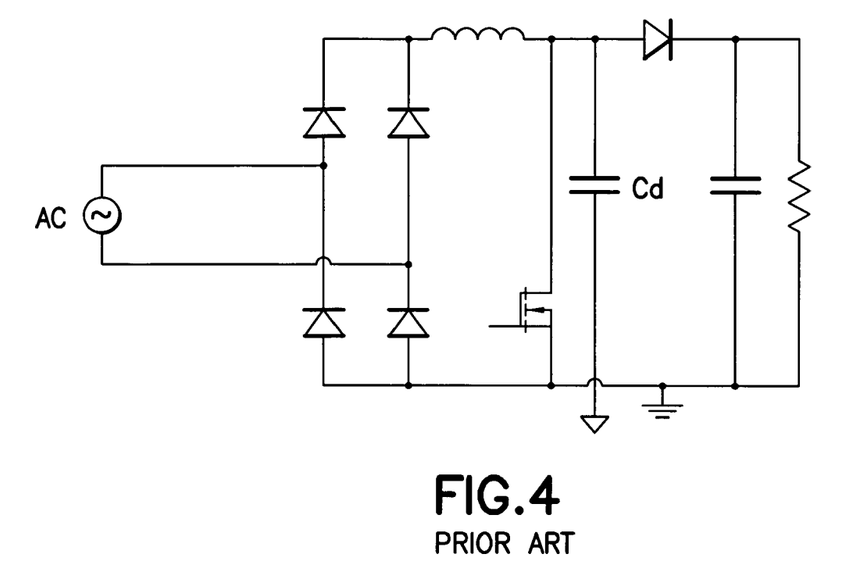
FIG. 4 is an equivalent circuit showing a parasitic capacitor Cd between the MOSFET drain and the earth ground that contributes to common mode EMI noise.

In the conventional PFC circuit of FIG. 2, at each half line cycle, the output ground is connected with the input line through a rectifier diode, as shown in FIGS. 3a and 3b, which respectively show the positive and negative half line cycles. Therefore, the only capacitance that contributes to common mode EMI noise is the parasitic capacitor Cd between the MOSFET drain and the earth ground, as shown in FIG. 4.

Additional improvements to bridgeless boost power factor correction circuits are described in Ser. No. 10/953,344, filed Sep. 29, 2004 (IR-2593), incorporated by reference. See also Ser. No. 60/666,950, filed Mar. 31, 2005 (IR-2965 PROV), incorporated by reference.

Figure 5A:
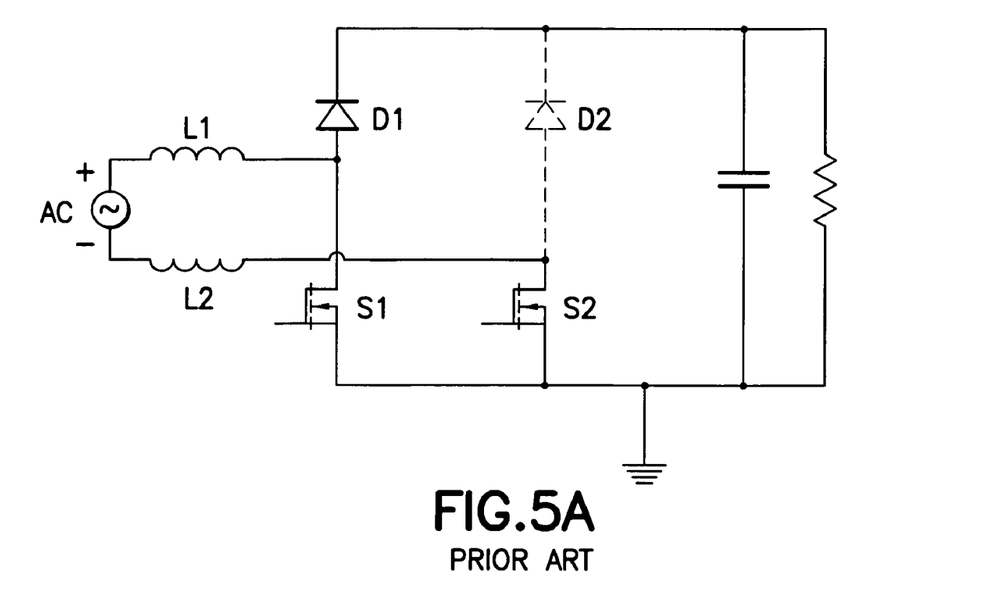
FIGS. 5a and 5b show equivalent circuits of the bridgeless PFC circuit of FIG. 1 during positive and negative half line cycles, respectively.
Figure 5B:
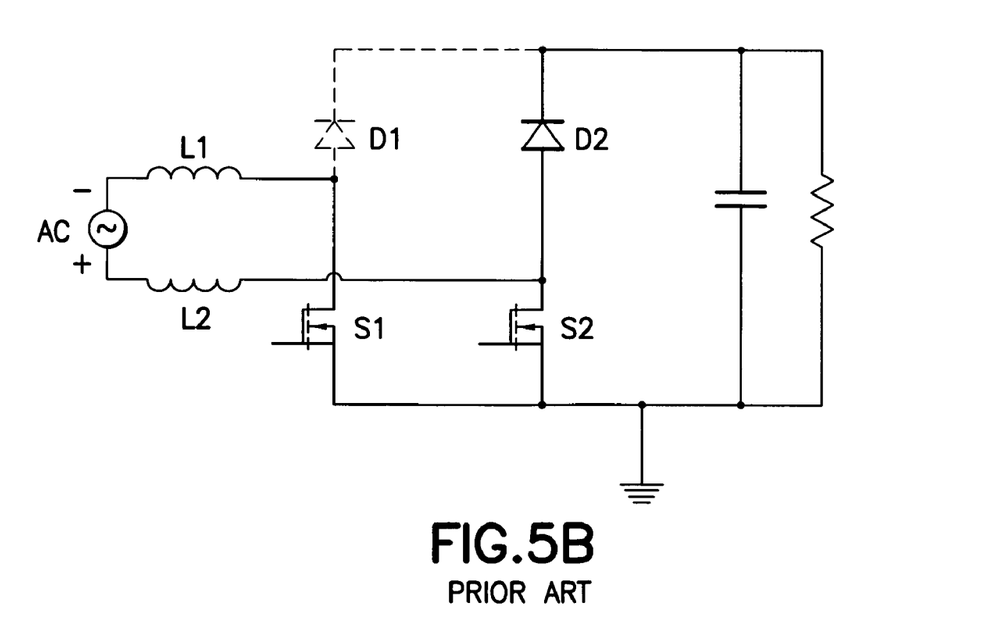
Figure 6:
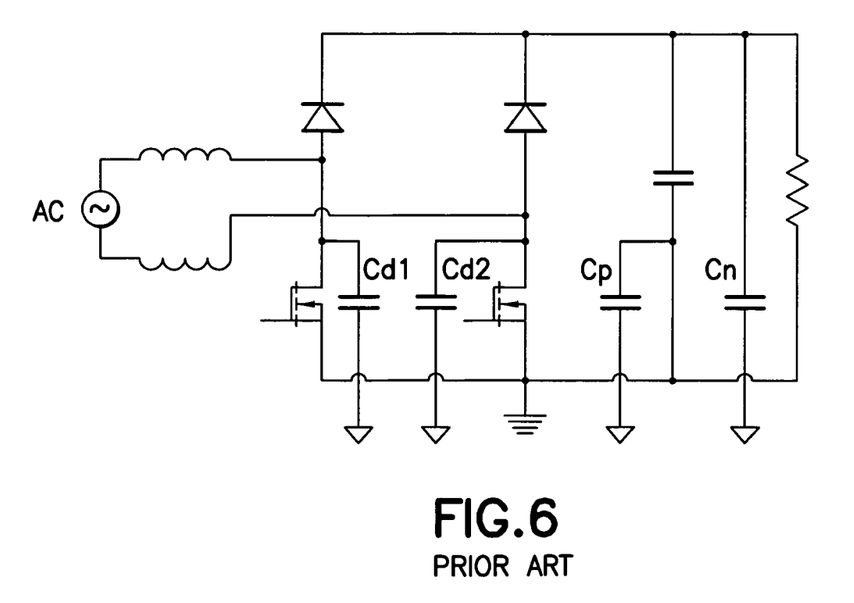
FIG. 6 is an equivalent circuit diagram showing parasitic capacitors Cd1 and Cd2 between the MOSFET drains and the earth ground and parasitic capacitors Cp and Cn between the output terminal and the earth ground.
Figure 7:
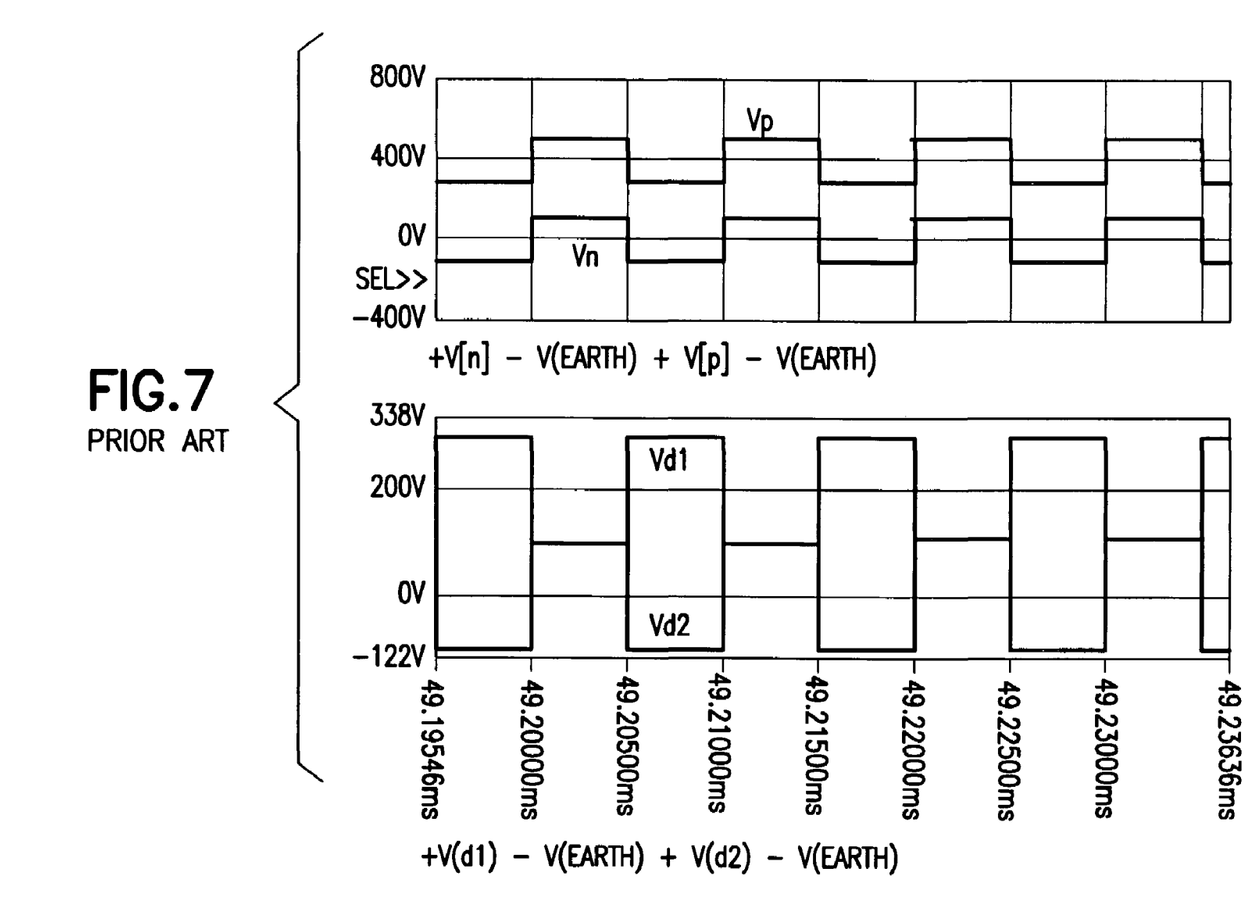
FIG. 7 comprises voltage waveforms showing that the parasitic capacitors contribute to the common mode EMI noise.

However, in the bridgeless circuit of FIG. 1, the boost inductor is split and located on the AC side of the circuit. Therefore, the output is not directly connected with the input line. The equivalent circuits of the bridgeless PFC circuit during the positive and negative half line cycle are shown in FIG. 5a and FIG. 5b. The circuit output therefore is floating comparing with the input line and earth ground. Simulation results show that the voltages on the MOSFET drains to the earth ground and thus parasitic capacitors Cd1 and Cd2 (FIG. 6) fluctuate with reverse polarity. And the voltages on the parasitic capacitors Cp and Cn (see FIG. 6) between the output terminal and the earth ground fluctuate with the same polarity. Thus all the parasitic capacitors contribute to common mode EMI noise, as shown in FIG. 7.

Although the common mode noise caused by the parasitic capacitances Cd1 and Cd2 between the MOSFET drains and the earth ground can be reduced or even cancelled by careful design of the parasitic capacitances Cd1 and Cd2 (i.e. by making them symmetrical), the common mode noise caused by the parasitic capacitances Cp and Cn between the output terminals and the earth ground cannot be cancelled. Considering that parasitic capacitance exists not only in the PFC circuit itself, but also in the load of the PFC circuit, common mode noise detriments both the PFC circuit itself and the load of the PFC circuit.

Figure 10:
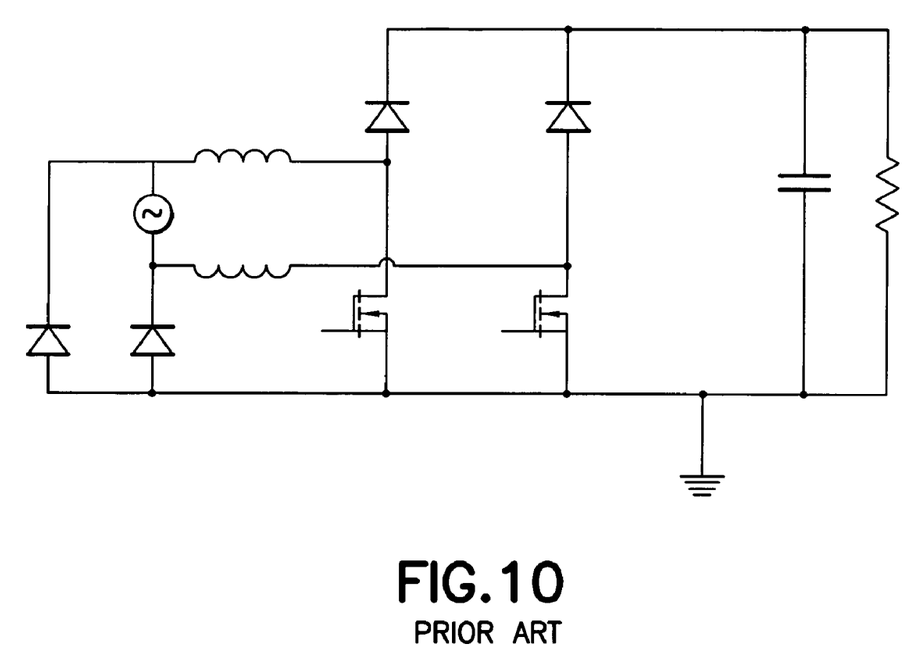
FIG. 10 is a schematic diagram of another known bridgeless PFC circuit.

Thus, although the bridgeless PFC circuit was invented around 20 years ago, it hasn't yet been accepted by the industry. Not only does the circuit suffer from severe EMI noise problems, it also has issues of voltage sensing and current sensing. Therefore, for the past 20 years, most of the work has been related to improving the control of the circuit, for example to improve the current sensing and voltage sensing in the bridgeless PFC circuit. One previous circuit has been developed that has improved the EMI performance of the bridgeless PFC circuit. The circuit schematic is shown in FIG. 10. A pair of diodes D3 and D4 are added to the conventional circuit of FIG. 1.

Figure 11A:
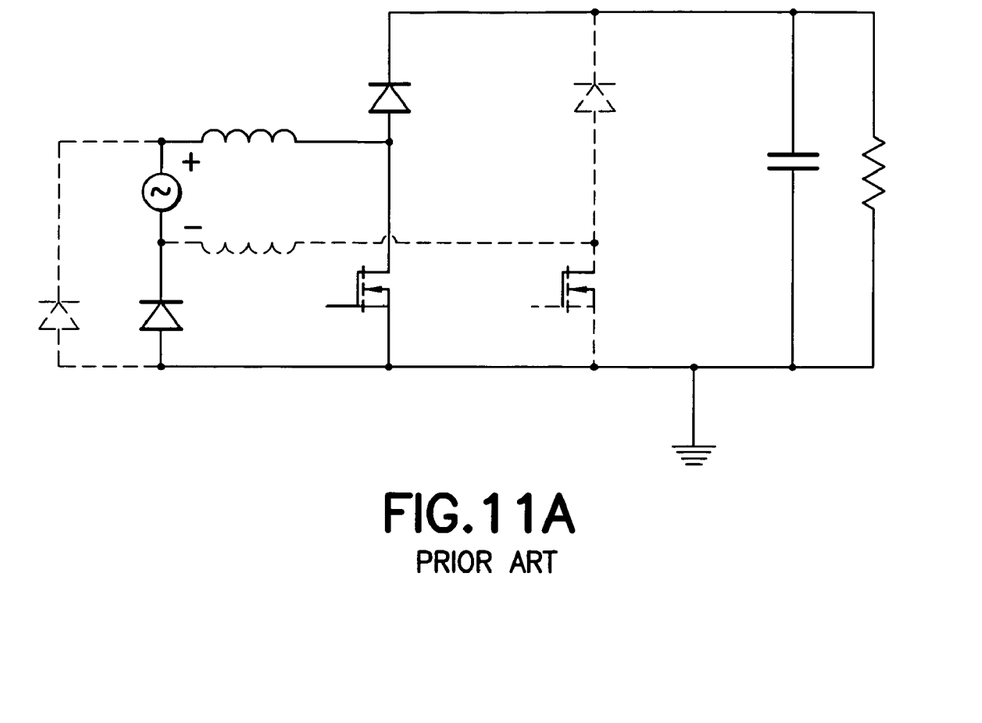
FIGS. 11a and 11b show equivalent circuits of the circuit of FIG. 10 operating at the positive and negative half line cycles, respectively.
Figure 11B:
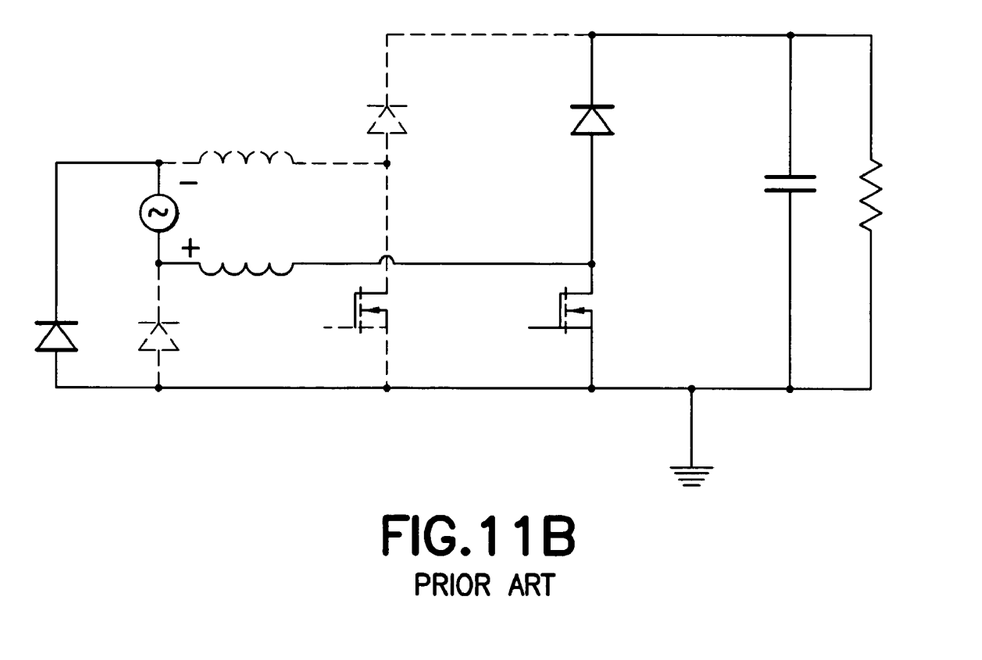

The equivalent circuits of the circuit operating at the positive and negative half line cycles are shown in FIGS. 11a and 11b, respectively. In each half line cycle, the bridgeless PFC circuit works as a boost DC/DC converter. And the overall circuit is equivalent two boost circuits added together. The output voltage ground is tied to the input line through the two diodes D3 and D4. Therefore, this circuit improves the circuit EMI performance and has EMI performance similar to that of the conventional PFC circuit.

SUMMARY OF THE INVENTION

To address the EMI noise issue, an EMI noise reduction circuit for the bridgeless PFC circuit adds additional capacitance to tie the output voltage to the input AC line. The capacitance may, for example be provided by a capacitor. In various embodiments of the invention, at least one and preferably two capacitors may be added to the conventional bridgeless PFC circuit.

Thus, the invention relates to a circuit and method for improving EMI noise performance in a bridgeless PFC boost converter. Such a converter may comprise a boost inductor having a first end connected to a first AC input terminal and a second end connected to a first junction defined between the anode of a first diode and a first terminal of a first switch; a second terminal of the first switch connected to a common line; a parallel circuit of a capacitance and a load connected between the cathode of the first diode and the common line; a series circuit of a second diode and a second switch connected between the cathode of the first diode and the common line; and a second AC input terminal connected to a second junction defined between the anode of the second diode and the second switch. High-frequency EMI noise is bypassed by placing a first filter capacitor between the first AC terminal and the common line. A second boost inductor may be connected between the second AC input terminal and the second junction, and a second filter capacitor may be connected between the second AC terminal and the common line. The first and/or second filter capacitor has a lower impedance in a high frequency range than the corresponding first or second boost inductor. Preferably the first and second capacitors have substantially the same capacitance.

Although the circuit of FIG. 10 can improve the bridgeless PFC circuit EMI performance, it suffers from several constraints.

Two extra diodes need to be used. In contrast, in the circuit described herein, the added capacitance is provided by a filter capacitor, so the cost will be much less.

Two extra diodes, requiring an extra heat sink, make the circuit more expensive and are avoided by the circuit according to the present disclosure.

Other features and advantages of the present invention will become apparent from the following description of embodiments of the invention which refers to the accompanying drawings.

DETAILED DESCRIPTION OF EMBODIMENTS OF THE INVENTION

Figure 8:
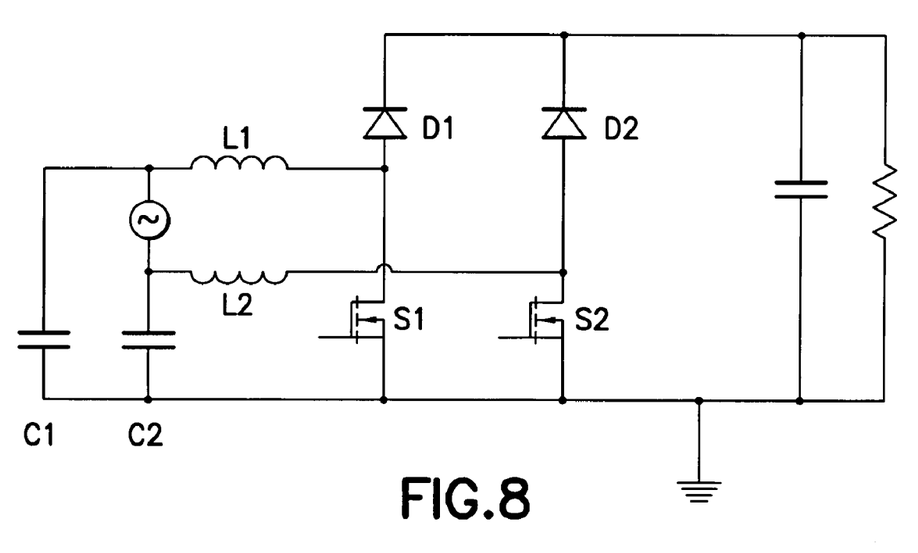
FIG. 8 shows a first embodiment of the invention.

A first embodiment of the invention is shown in FIG. 8.

Figure 9A:
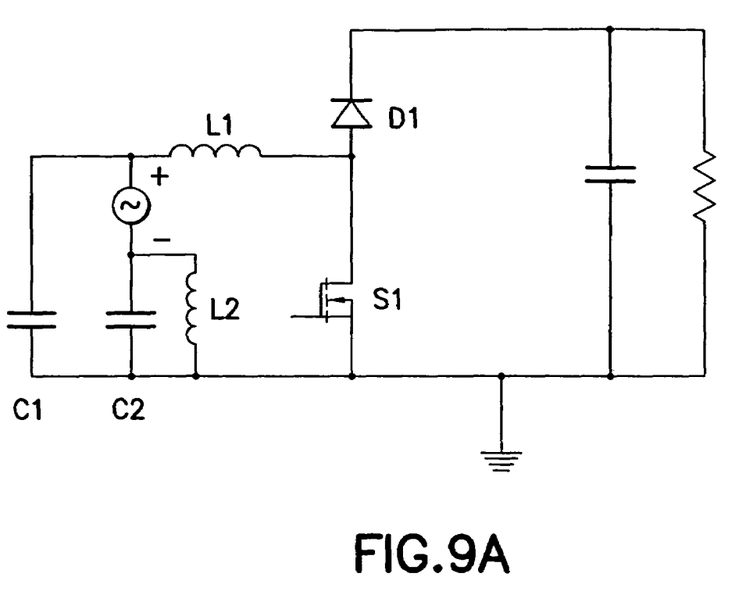
FIGS. 9a and 9b show equivalent circuits of the circuit of FIG. 8 at the positive and negative half line cycles, respectively.
Figure 9B:
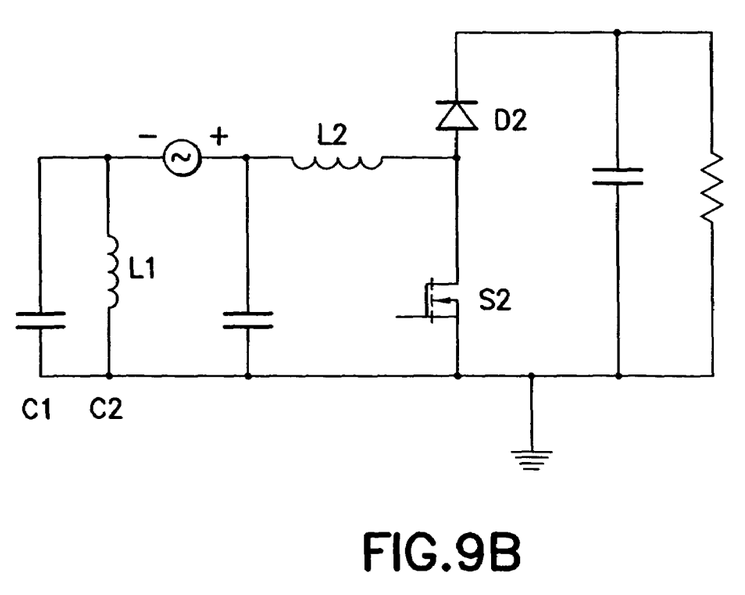

The equivalent circuits of the new circuit at each half line cycle are shown in FIGS. 9a and 9b, respectively. The capacitors C1 and C2 have the same capacitance and voltage rating at 600V DC, and they can be considered substantially shorted at the switching frequency, which means that their impedance at the switching frequency is much smaller than the boost inductor's impedance at the same frequency. Since the impedance of a capacitor decreases with increasing frequency, while the impedance of an inductor increases with frequency, the capacitor may be considered substantially to be a short circuit for the whole high frequency range, as compared with the boost inductor.

In another embodiment of the invention, some EMI improvement may be obtained by using only one capacitor; however, it is preferably to include both of the two capacitors.

The switches S1 and S2 may be MOSFETs, bidirectional switches, bidirectional MOSFETS, or GaN devices, or any equivalent or alternative thereof.

In the positive half line cycle equivalent circuit shown in FIG. 9a, the inductor L1, MOSFET S1 and diode D1 provide the boost DC/DC converter and C1 serves as an input filter capacitor. Meanwhile, inductor L2 and C2 are connected in parallel. Since the impedance of the capacitor is much smaller than the impedance of the inductor, the inductor L2 is shorted by the capacitor C2 at a frequency higher than the switching frequency. All the high frequency noise therefore passes through the capacitor and the inductor only carries the low frequency current. Since the impedance of the capacitance is so small at high frequency, the output voltage ground is tied together with the input line. Therefore, the parasitic capacitors between the output terminals and the earth ground no longer contribute to the common mode noise. In this case the only capacitors that contribute to the common mode noise are the parasitic capacitors between the MOSFET drains to the earth ground, which means that the circuit EMI noise level becomes similar to that of the conventional PFC circuit.

From the analysis above, benefits of the new circuit can be described as follows:

Circuit structure is simple and low cost.

There are fewer capacitors contributing to the common mode noise, so the common mode EMI noise can be much reduced.

As compared with the conventional PFC circuit, the new circuit has similar EMI noise performance, and the EMI filter design can use the conventional PFC circuit parameters, which can further reduce the design cost.

Although the present invention has been described in relation to particular embodiments thereof, many other variations and modifications and other uses will become apparent to those skilled in the art. Therefore, the present invention is not limited by the specific disclosure herein.

What is claimed is:

1. A bridgeless PFC boost converter comprising:
a boost inductor having a first end connected to a first AC input terminal and a second end connected to a first junction defined between the anode of a first diode and a first terminal of a first switch;
a second terminal of the first switch connected to a common line;
a parallel circuit of a capacitance and a load connected between the cathode of the first diode and the common line;
a series circuit of a second diode and a second switch connected between the cathode of the first diode and the common line;
a second AC input terminal connected to a second junction defined between the anode of the second diode and the second switch; and
a first filter capacitor connected between said first AC terminal and said common line.

2. A bridgeless PFC boost converter according to claim 1, wherein said first and second switches are MOSFETs.

3. A bridgeless PFC boost converter according to claim 2, wherein said first and second switches are bidirectional MOSFETs.

4. A bridgeless PFC boost converter according to claim 1, wherein said first and second switches are bidirectional switches.

5. A bridgeless PFC boost converter according to claim 4, wherein said bidirectional switches are GaN devices.

6. A bridgeless PFC boost converter according to claim 1, further comprising a second boost inductor connected between said second AC input terminal and said second junction, and a second filter capacitor connected between said second AC terminal and said common line.

7. A bridgeless PFC boost converter according to claim 6, wherein said second filter capacitor has a lower impedance in a high frequency range than said second boost inductor.

8. A bridgeless PFC boost converter according to claim 6, wherein said first and second capacitors have substantially the same capacitance.

9. A bridgeless PFC boost converter according to claim 1, wherein said first and second switches are MOSFETs, each having a respective body diode whose cathode is connected to the corresponding one of said first and second junction points.

10. A bridgeless PFC boost converter according to claim 9, wherein said MOSFETs each have a pair of main terminals connected respectively to said common line and to the corresponding one of said first and second junctions; and a gate terminal for controlling the MOSFET.

11. A bridgeless PFC boost converter according to claim 1, wherein said first filter capacitor has a lower impedance in a high frequency range than said first boost inductor.

12. A method of reducing EMI noise in a bridgeless PFC boost converter comprising:
  a boost inductor having a first end connected to a first AC input terminal and a second end connected to a first junction defined between the anode of a first diode and a first terminal of a first switch;
  a second terminal of the first switch connected to a common line;
  a parallel circuit of a capacitance and a load connected between the cathode of the first diode and the common line;
  a series circuit of a second diode and a second switch connected between the cathode of the first diode and the common line; and
  a second AC input terminal connected to a second junction defined between the anode of the second diode and the second switch;
  the method comprising the step of connecting a first filter capacitor between said first AC terminal and said common line.

13. The method according to claim 12, wherein a second boost inductor is connected between said second AC input terminal and said second junction, and further comprising the step of connecting a second filter capacitor between said second AC terminal and said common line.

14. The method according to claim 13, further comprising the step of selecting said second filter capacitor to have a lower impedance in a high frequency range than said second boost inductor.

15. The method according to claim 13, further comprising the step of providing said first and second filter capacitors with substantially the same capacitance.

16. The method according to claim 12, further comprising the step of selecting said first filter capacitor to have a lower impedance in a high frequency range than said first boost inductor.

* * * * *